(12) United States Patent
Frenkel

(10) Patent No.: US 10,633,506 B2
(45) Date of Patent: Apr. 28, 2020

(54) RECONSTITUTED COMPOSITE MATERIALS DERIVED FROM WASTE MADE BY SOLID STATE PULVERIZATION

(71) Applicant: Stuart D. Frenkel, Centreville, VA (US)

(72) Inventor: Stuart D. Frenkel, Centreville, VA (US)

(*) Notice: Subject to any disclaimer, the term of this patent is extended or adjusted under 35 U.S.C. 154(b) by 623 days.

(21) Appl. No.: 15/251,351

(22) Filed: Aug. 30, 2016

(65) Prior Publication Data

US 2017/0058094 A1 Mar. 2, 2017

Related U.S. Application Data

(60) Provisional application No. 62/212,641, filed on Sep. 1, 2015.

(51) Int. Cl.

| | | |
|---|---|---|
| C08J 11/06 | (2006.01) | |
| C08K 3/40 | (2006.01) | |
| B29B 9/08 | (2006.01) | |
| B29B 9/16 | (2006.01) | |
| B29B 17/00 | (2006.01) | |
| B02C 19/00 | (2006.01) | |
| B02C 23/00 | (2006.01) | |
| B02C 18/06 | (2006.01) | |

(Continued)

(52) U.S. Cl.
CPC .......... *C08J 11/06* (2013.01); *B02C 18/06* (2013.01); *B02C 19/00* (2013.01); *B02C 23/00* (2013.01); *B29B 7/46* (2013.01); *B29B 7/905* (2013.01); *B29B 9/06* (2013.01); *B29B 9/08* (2013.01); *B29B 9/16* (2013.01); *B29B 17/0026* (2013.01); *B29B 17/0036* (2013.01); *C08K 3/40* (2013.01); *B02C 2018/307* (2013.01); *B29C 48/03* (2019.02); *B29C 48/287* (2019.02); *B29C 48/402* (2019.02); *B29C 48/832* (2019.02); *B29C 48/834* (2019.02); *B29K 2105/16* (2013.01); *B29K 2105/26* (2013.01); *B29K 2509/08* (2013.01); *C08J 2323/12* (2013.01); *C08J 2423/06* (2013.01); *C08K 2201/005* (2013.01); *Y02W 30/62* (2015.05)

(58) Field of Classification Search
CPC . Y02W 30/62; Y02W 30/625; Y02W 30/701; Y02W 30/521; B29B 13/10; B29B 17/00; B29B 17/04; B29B 17/0404; B29B 17/0024; B29B 17/045; B29B 2017/0416; B29B 2017/042; B29B 2017/0464; B29B 2017/0468; B29B 7/00; B29B 7/002; B29B 7/005; B29B 7/007; B29B 7/90; B29B 9/02; B29B 9/06; B29B 2709/08; Y10S 264/911; Y10S 264/92; B02C 18/06; B02C 2018/307; B02C 23/00; B02C 19/00; B02C 19/22
USPC .......... 241/23, 65, 82.1, 260, 260.1; 521/40; 264/211.21, 211.23
See application file for complete search history.

(56) References Cited

U.S. PATENT DOCUMENTS

| | | |
|---|---|---|
| 4,250,222 A | 2/1981 | Mavel et al. |
| 4,607,796 A | 8/1986 | Enikolopov et al. |

(Continued)

*Primary Examiner* — Shelley M Self
*Assistant Examiner* — Katie L. Parr

(57) ABSTRACT

A method of making polymeric composite particles from polymeric scrap material, virgin polymeric material, or mixtures thereof and glass particles by subjecting a mixture of the polymeric particles and glass particles to a solid state shear pulverization and in-situ polymer compatibilization.

18 Claims, 4 Drawing Sheets

(51) Int. Cl.
  *B29B 7/46* (2006.01)
  *B29B 7/90* (2006.01)
  *B29K 105/16* (2006.01)
  *B29K 105/26* (2006.01)
  *B29K 509/08* (2006.01)
  *B02C 18/30* (2006.01)
  *B29C 48/40* (2019.01)
  *B29C 48/03* (2019.01)
  *B29C 48/80* (2019.01)
  *B29C 48/285* (2019.01)
  *B29B 9/06* (2006.01)

(56) References Cited

U.S. PATENT DOCUMENTS

| | | | |
|---|---|---|---|
| 4,728,698 A * | 3/1988 | Isayev | C08L 69/00 264/108 |
| 4,772,430 A | 9/1988 | Sauda et al. | |
| 4,968,463 A | 11/1990 | Levasseur | |
| 5,026,512 A * | 6/1991 | Chang | B29C 45/0001 264/40.6 |
| 5,395,055 A | 3/1995 | Shutov et al. | |
| 5,397,065 A | 3/1995 | Shutov et al. | |
| 5,415,354 A | 5/1995 | Shutov et al. | |
| 5,704,555 A | 1/1998 | Arastoopour | |
| 5,743,471 A * | 4/1998 | Ivanov | B29B 13/10 241/16 |
| 5,814,673 A | 9/1998 | Khait | |
| 6,172,125 B1 * | 1/2001 | Vandenhende | C08J 11/08 521/46.5 |
| 6,180,685 B1 | 1/2001 | Khait | |
| 6,284,186 B1 * | 9/2001 | Hansen | B29C 70/58 264/310 |
| 6,479,003 B1 | 11/2002 | Furgiuele et al. | |
| 6,494,390 B1 * | 12/2002 | Khait | B29B 17/0404 241/23 |
| 6,513,737 B2 * | 2/2003 | Ivanov | B29B 17/0404 241/23 |
| 6,849,215 B2 | 2/2005 | Khait | |
| 7,470,453 B1 * | 12/2008 | Lewis | B65G 15/32 427/372.2 |
| 7,935,737 B2 * | 5/2011 | Gopal | C08J 11/24 521/40 |
| 10,093,035 B1 * | 10/2018 | Torkelson | B29B 7/482 524/585 |
| 2004/0041042 A1 * | 3/2004 | Samuels | B29B 9/02 241/29 |
| 2013/0099160 A1 * | 4/2013 | Topolkaraev | B29C 48/9145 252/194 |
| 2015/0002118 A1 * | 1/2015 | Pan | H02M 3/07 323/282 |
| 2015/0051339 A1 * | 2/2015 | Brunner | B29B 7/482 524/585 |
| 2015/0328801 A1 * | 11/2015 | Vainer | H02M 3/07 323/282 |

* cited by examiner

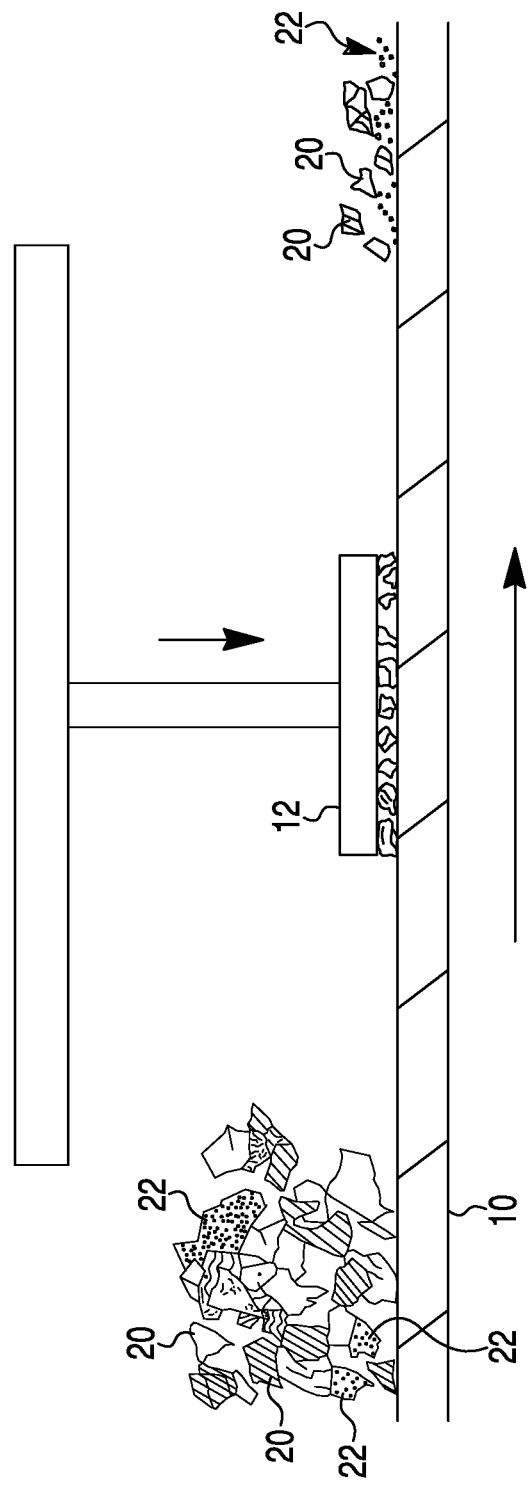

RECONSTITUTED COMPOSITE MATERIALS DERIVED FROM WASTE MADE BY SOLID STATE PULVERIZATION

FIELD OF THE INVENTION

The present invention relates to improvements in the solid state shear pulverization of polymeric material, which may include thermodynamically incompatible polymers, to form without compatibilizing agents pulverized particulates that are directly melt processable as powder feedstock to shaped articles of manufacture by conventional blow molding, rotational molding, extrusion, and spray coating techniques without color streaking in the resulting articles of manufacture.

BACKGROUND OF THE INVENTION

Decreasing landfill space and rapidly rising disposal costs have forced many municipalities to begin curbside recycling of post-consumer plastic (polymeric) waste. In the 1990's, plastic materials comprised approximately 20% by volume of the municipal waste stream. For example, Chem Systems, 1992, reported that municipal solid waste plastic comprised, by weight, 48% polyethylene (PE) (27% being low density PE and 21% being high density PE), 16% polypropylene (PP), 16% polystyrene (PS), 6.5% polyvinyl chloride (PVC), 5% polyethylene terephthalate (PET), 5% polyurethane, and 3.5% other plastics.

Post-consumer polymeric waste, as opposed to industrial plastic waste, typically includes substantial quantities of plastic bottles, containers and packaging materials. Plastic bottles are molded of different polymeric materials depending upon the product they are to contain. For example, plastic bottles for water, milk, and household chemicals typically are made of high density polyethylene (HDPE), while soft drink bottles are typically made of polyethylene terephthalate (PET) with or without base caps made from high density polyethylene (HDPE). Generally, HDPE bottles account for approximately 50-60% and PET bottles account for approximately 20-30% of the bottles used by consumers. The balance of bottles, bottle caps and other containers used by consumers comprises other polymeric materials, such as low density polyethylene (LDPE), linear low density polyethylene (LLDPE), polypropylene (PP), polystyrene (PS), polyvinyl chloride (PVC), and other resins and multi-layered materials Plastic packaging materials also are made of a wide variety of polymers. For example, according to Plastics Compounding, November/December, 1992, the following polymers were used in packaging material in the %'s set forth: 27% LDPE, 21% HDPE, 16% PS, 16% PP, and 5% PET.

Post-industrial plastic waste can comprise polyolefins, PS, PET and other polymeric materials used for plastic packaging.

Currently, collection of plastic waste material exceeds the market demand for recycled plastic products as a result of the dearth of viable recycling technologies that are low cost and produce high quality recycled plastic products. One recycling approach has involved the high energy consuming batch grinding of commingled, unsorted mixed color plastic waste to form flake scrap material, melt processing and pelletizing the melt processed material to pellets, and extruding the pelletized plastic waste to form recycled plastic products. However, recycled plastic products made in this manner suffer from severe deficiencies that render the products unsatisfactory for many purposes and are of inferior, low value compared to products made of virgin polymeric materials. For example, these recycled plastic products exhibit inferior mechanical properties (e.g. tensile, flexural and impact strength) and inferior appearance in terms of color (dark brown or gray color) with streaking of colors within the molded product as a result of the chemical incompatibility of the different polymers present in the initial plastic waste stream and variations in the plastic waste stream composition over time.

A typical example of a low value, recycled plastic product is recycled plastic lumber having a dark brown or gray color with noticeable color streaking and inferior mechanical properties compared to components molded of virgin materials. As a result of the less than pleasing appearance, recycled plastic lumber is oftentimes painted to improve its appeal to the customer, or expensive pigments and other additives are added to the feedstock during the manufacturing process to this end. However, the cost of the recycled product is increased thereby.

Furthermore, certain melt processing techniques, such as blow molding, rotational molding, extrusion (e.g. extruded PVC pipe and profiles), and spray coating, require a plastic powder feedstock. That is, the flake scrap material is not directly melt processable to articles of manufacture by such powder feedstock-requiring melt processing techniques. To be useful as feedstock in such melt processing techniques, sorted or unsorted flake scrap material produced by batch grinding must be pelletized and then ground to powder form. The need to pelletize and grind sorted or unsorted flake scrap polymeric material prior to such melt processing adds considerably to the cost and complexity of recycling scrap plastics as well as the capital equipment expenditures required.

Currently used injection molding techniques require plastic pellets for high speed production of molded parts. Although unsorted, commingled flake scrap materials could be pelletized to provide feedstock for injection molding, the resultant molded products would suffer from the types of deficiencies discussed above attributable to polymer incompatibility.

So-called compatibilizing agents and/or reinforcing agents can be added to flake plastic scrap material comprising chemically incompatible polymers in attempts to produce a recycled plastic product exhibiting more desirable characteristics. The Mavel et al. U.S. Pat. No. 4,250,222 relates to a recycling approach in which incompatible plastic materials are simply coarsely ground together, and a filler such as fibers, including glass fibers are added to the coarsely ground mixture under heat and pressure. Other non-fibrous fillers can also be added.

Attempts have been made to sort commingled, post-consumer plastic scrap to overcome the polymer incompatibility problems associated with the recycling of commingled plastic scrap. To-date, HDPE and PET are recovered from plastic waste streams by recycling technologies requiring sorting of the commingled plastic materials. Sorting can require use of costly techniques, such as video cameras, electronic devices, infrared detectors, and organic "markers", to provide effective segregation of like plastics. However, even sorted plastic waste can present problems in processing as a result of density and chemical differences among polymers falling in the same general class and made by different plastics manufacturers.

Further, sorted plastic scrap must be subjected to batch grinding to produce flake scrap material that then must be pelletized and ground again to provide powder feedstock for blow molding, rotational molding, some extruding, spray coating and other melt processing techniques that require powder feedstock.

The high cost of sorting has greatly limited widespread use of recycling approaches that require a sorting step. In particular, collected and sorted post-consumer plastic materials are usually more expensive than the corresponding virgin plastic materials. Thus, users of plastic materials are discouraged from using sorted, recycled plastic materials.

A process developed by inventors from Northwestern University, Evanston, Ill., and exemplified by U.S. Pat. Nos. 5,814,673; 6,180,685; 6,479,003 and 6,849,215, herein incorporated by reference in their entirety, provide in one aspect a method of making polymeric particulates (e.g. powder) wherein sorted or unsorted, commingled polymeric scrap material, virgin polymeric material and mixtures thereof are supplied to extruder screw means rotated to transport the material along the length thereof and in the solid state convert the material to pulverized particulates (e.g. powder) that are melt processable directly by conventional blow molding, rotational molding, extrusion, spray coating and other melt processing techniques requiring a powder feedstock. This avoids the need for and costs associated with flake pelletizing and pellet grinding operations heretofore required.

The solid state pulverized particulates also are melt processable by conventional molding, extruding, spray coating and the like to form articles of manufacture having a substantially homogenous color appearance without color streaking or marbleizing. This color homogeneity is achievable regardless of whether the particulates include mixed color polymeric material of the same or different composition. This avoids the need for the addition of pigments and/or compatibilizing agents to the feedstock and the need to paint the molded or extruded product to hide unpleasing colors and color streaking.

The method of making polymeric particulates, as disclosed in the above mentioned patents include providing polymeric material, such as unsorted polymeric scrap material, comprising two or more thermodynamically incompatible polymers and supplying such polymers to extruder screw means rotated to transport the material along the length thereof and subject the material to solid state pulverization and in-situ polymer compatibilization. In-situ polymer compatibilization is evidenced, in one instance, by the resulting pulverized polymeric particulates exhibiting a thermogram different from that of the precursor unpulverized material. For example, the pulverized particulates of the invention exhibit a melting peak and/or crystallization peak quite different from that (those) of the unpulverized material. Moreover, molded articles produced from the pulverized particulates of the invention exhibit increased tensile strengths and lack of delamination upon breaking in mechanical testing, this being a further indication of in-situ polymer compatibilization.

Recently, in order to increase consumer recycling, municipalities have allowed single bin recycling, in which all recyclable material including plastic, glass and paper products can be commingled. While this has improved the amount of materials being recycled, it is has also raised a problem in that during the collection process, the glass component being recycled often breaks, causing pieces of the glass to be spread and commingled with the plastic material. To remove all the shreds of glass from the plastic recyclable component can be costly, to the point that it is unprofitable to recycle and reuse the plastic components. Accordingly, the single bin convenience of recycling simply results in much of the recyclable material, in particular, plastic, to be unusable, and as such, is often sent to landfills. This obviously defeats the purpose for recovering recyclable plastic material.

It is an object of the invention to provide a method of processing one or more polymeric materials, such as sorted or unsorted, commingled scrap polymeric material, including glass particle scrap, by solid state pulverization to produce pulverized particulates (e.g. powder) that can be directly formed to shape by powder feedstock-using melt processing techniques.

It is another object of the invention to provide a method of processing polymeric materials, such as sorted or unsorted, commingled scrap polymeric materials, having mixed colors by solid state pulverization to produce pulverized glass-filled particulates that are melt processable to a substantially homogeneous light color without color streaking or marbleizing despite being produced from the mixed color scrap materials.

It is a further object of the invention to provide a method of processing unsorted polymeric materials in a manner to achieve in-situ compatibilization of different polymers present.

It is a further object of the present invention to provide a method of recycling commingled scrap polymeric and glass materials without sortation and in a manner to achieve in-situ compatibilization of different polymers present and produce recycled glass-filled polymeric particulates without the need for a compatibilizing agent.

It is still another object of the present invention to provide a method of recycling commingled, mixed-color scrap polymeric and glass materials without sortation and in a manner to produce recycled glass-filled polymeric particulates that are melt processable to homogeneous light color without color streaking or marbleizing.

It is still another object of the present invention to provide solid state pulverized glass-filled polymeric particulates that are suitable as powder feedstock for melt processing by blow molding, rotational molding, some extruding, spray coating and other powder feedstock-using melt processing techniques.

It is still a further object of the invention to produce articles of manufacture, including molded parts and coatings, made from the aforementioned solid state pulverized polymeric and glass particulates.

SUMMARY OF THE INVENTION

In accordance with this invention, polymeric scrap material, whether from industrial or consumer use, and which is contaminated with glass recycled material can now be treated by the process described in the aforementioned patents and process developed at Northwestern University. In this invention, the commingled plastic and glass material is pre-treated to either grind or otherwise press the glass contaminants into small particulates prior to being treated by the solid state pulverization and in-situ polymer compatibilization process developed by Northwestern University. By this process, the glass particles essentially fill the plastic particles which are formed in-situ and, possibly, if such glass particles are small enough, may be incorporated into the compatibilized polymer chain as silyl or siloxane groups.

The polymeric scrap material and/or virgin material can include thermoplastics, polymer blends, polymer alloys, thermosets, elastomers and other polymeric materials. Typically, the polymeric material is comminuted to flake form by grinding, chopping or shredding using conventional equipment prior to pulverization. The pulverization process uses as scrap feedstock a material that is in a physical form (e.g. comminuted flakes) commonly available from scrap collections and municipal recycling centers.

Also, in practicing the present invention, the polymeric material can be heated during the initial stage of the pulverization operation depending upon the make-up (composition) of the feedstock followed by cooling during subsequent stages of the pulverizing operation to maintain proper temperature control for solid state pulverization, in-situ polymer compatibilization and production of desired powder size. Preferably, however, the polymeric material is only subjected to frictional heating during the initial stage of the pulverization operation by engagement with the rotating screws. That is, solid state shear pulverization of the polymeric material preferably is conducted without heating of the material by any external extruder barrel heating device. Temperature control of the polymeric material during the pulverization operation is thereby facilitated to reduce degradation of the polymers and dye materials used with the feedstock polymers. Energy consumption during the pulverization operation also is reduced.

The present invention also provides solid state pulverized particulates produced from scrap polymeric material and/or virgin polymeric material and scrap glass material, and wherein the particulates are suitable as powder feedstock, without conventional melt pelletizing and pellet grinding, for direct melt processing to shape using blow molding, rotational molding, some extrusion, spray coating, and other powder feedstock-using techniques.

The present invention further provides solid state pulverized polymeric composite particulates comprising two or more otherwise thermodynamically incompatible polymers and glass particulates produced from commingled, unsorted polymeric scrap and glass materials and/or virgin materials. The polymers and glass are in-situ compatibilized by solid state shear pulverization as evidenced by one or more different thermogram characteristics between recycled particulates of the invention and unpulverized polymeric material. Typically, the solid state pulverized particulates exhibit enhanced reactivity as compared to the unpulverized polymeric material.

Moreover, the present invention provides glass-filled solid state pulverized polymeric particulates that exhibit, pulverized and as-melt processed, a substantially homogenous color despite being pulverized from mixed-color scrap material.

Articles of manufacture and powder coatings produced from the solid state pulverized particulates of the present invention exhibit mechanical properties generally superior to those exhibited by like processed flake polymeric material of the same composition depending on the polymer components involved. Importantly, they also exhibit a substantially homogeneous color characterized by the absence of color streaking or marbleizing. Typically, the articles of manufacture exhibit a substantially homogeneous pastel color tone corresponding to a dominant color of a scrap component in the polymeric feedstock. Importantly, the recycled, pulverized particulates of the invention made from mixed-color polymeric feedstock can be used in molding a plurality of articles of manufacture that exhibit substantially the same homogeneous pastel color from one article to the next. In contrast, a mixture of unpulverized flake polymeric material of like composition and mixed color produces molded articles exhibiting inconsistent colors from one molded article to the next.

The present invention is advantageous in that the glass-filled, pulverized particulates are suitable for direct use as powder feedstock for powder feedstock-using melt processing techniques without the need for pelletizing and pellet grinding operations. Moreover, commingled scrap polymer materials, virgin polymeric materials and mixtures thereof can be processed in a manner to achieve in-situ compatibilization of different polymers in a once-through pulverization operation without the need for a compatibilizing agent and without sortation in the case of commingled scrap feedstock. The glass-filled, pulverized particulates may be mixed with other fillers, reinforcing agents, flame retardants, antioxidants and other additives commonly used in the plastics industry if desired.

The aforementioned objects and advantages will become more readily apparent from the following detailed description and drawings.

BRIEF DESCRIPTION OF THE DRAWINGS

FIG. 5 is a schematic illustration of a proposed process for pre-treating a mixed scrap stream of plastic and glass.

DETAILED DESCRIPTION

Figure 1:
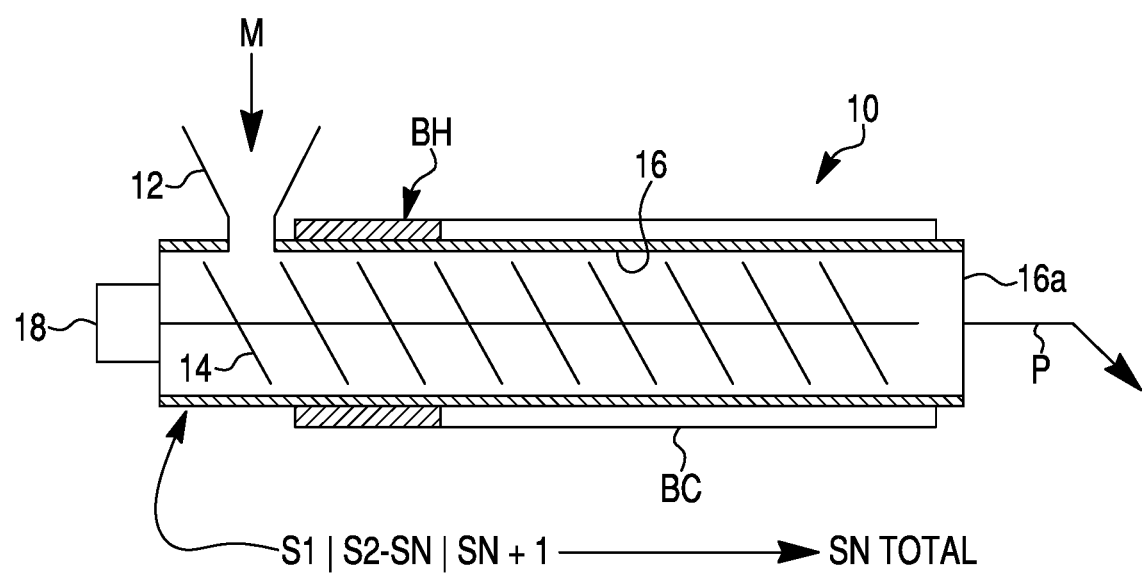
FIG. 1 is a schematic sectional view of a twin-screw extruder for practicing an embodiment of the invention.

In one embodiment, the present invention provides a method of making recycled polymeric particulates, such as powder, from post-consumer and/or post-industrial polymeric scrap material that may be sorted or unsorted, commingled so as to include two or more different scrap polymers, as well as post-consumer and/or post-industrial glass particles.

Post-consumer polymeric waste typically includes substantial quantities of plastic bottles, containers and packaging materials made of different polymers. For example, plastic bottles for water, milk, and household chemicals typically are made of high density polyethylene (HDPE), while soft drink bottles are typically made of polyethylene terephthalate (PET) with or without base cups made of HDPE. Generally, HDPE bottles account for approximately 50-60% and PET bottles account for approximately 20-30% of the bottles used by consumers. The balance of bottles and other containers used by consumers comprise other polymeric materials, such as low density polyethylene (LDPE), linear low density polyethylene (LLDPE), polypropylene (PP), polystyrene (PS), polyvinyl chloride (PVC), and other resins and multi-layered materials Post-consumer polymeric waste also includes plastic packaging materials that are made of a wide variety of polymers including LDPE, LLDPE, HDPE, PS, PP, PET and others.

Post-industrial plastic waste can comprise polyolefins, PS, PET, and other polymeric materials used for plastic packaging.

Sorted polymeric scrap material typically comprises a single polymer composition collected from one or more sources and sorted pursuant to standard polymer codes now used on plastic bottles, containers and the like. Sorted polymeric scrap material typically includes scrap of different colors since to-date color sorting is not yet common.

Unsorted, commingled scrap material can include myriad types of polymeric scrap materials including, but not limited to, HDPE, LLDPE, LDPE, PP, PS, PET, PVC, PC (polycarbonate), ABS/PC (acrylonitrile butadiene styrene/polycarbonate), PPo (polyphenylyene oxide)/PS and others. In general, commingled, unsorted scrap can include thermoplastics, polymer blends, polymer alloys, thermosets, elastomers and other scrap polymeric materials.

Typically, unsorted, commingled scrap material will include mixtures of incompatible polymers such as mixtures of HDPE and PET, mixtures of HDPE and PS, mixtures of PP and PS, mixtures of PP and PS, mixtures of HDPE, LLDPE, LDPE with PET and/or PS for purposes of illustration. By mutually thermodynamically incompatible is meant that two or more polymers have different glass transition temperatures, Tg, and when processed by melt mixing, separate into distinct microscopic phases which are reflected in mechanical property deficiencies.

The presence of these incompatible polymers has rendered previous attempts at reclamation of unsorted, commingled scrap highly costly due to the need for sortation and/or addition of one or more of compatibilizing agents, reinforcing agents, fillers, and pigments and also ineffective in yielding a high value recycled product having aesthetic characteristics and mechanical properties approaching those achievable with virgin plastic material.

The commingled, unsorted plastic scrap typically will include polymeric scrap materials having various colors as a result of the wide variety of colorants used in the plastic bottling, container and other plastic industries.

Thermodynamic polymer incompatibility readily manifests itself in resulting molded polymeric products that are characterized by one or more of delamination, brittleness, and inconsistent mechanical properties from one molded part to the next. Moreover, parts molded from mutually incompatible, mixed-color polymers are typically characterized by inconsistent color from one molded part to the next and also by color streaking or marbleizing through the same molded part. These characteristics are observed regardless of whether the thermodynamically incompatible polymers are virgin materials or scrap polymer materials.

In this invention, it is necessary that the glass which contaminates or is otherwise commingled with the plastic scrap material must be treated to reduce the particulate size of the glass component. Methods of reducing the particulate size of the glass scrap component can be achieved by grinding the commingled plastic and glass components. Another method of achieving the reduction of size of the glass particulates is shown in FIG. 5, wherein a heavy metallic press 2 pounds and crushes the commingled plastic and glass materials. As shown in FIG. 5, a mixture of plastic 20 and glass 22 can be placed on a moving conveyer 10. As the mixture of plastic and glass travel under press 12, the press is moved to crush the glass material. The commingled glass and plastic moves relative to press 12, causing the glass to be treated not only by the initial crushing pressure of press 12, but also by a grinding force due to the relative movement of press 12 and conveyer 10. It is believed that for the glass to be fully compatibilized with the eventual formed polymer, the glass must be reduced to a particle size of less than 1,000 microns, preferably less than 500 microns, and more preferably, less than 200 microns. It is believed that exceptional results can be achieved if the glass contamination is broken into a particle size of 0.5 to 150 microns.

In accordance with a particular illustrative embodiment of the present invention, unsorted, commingled plastic and glass scrap materials, which have been treated to reduce the particle size of the glass material as noted immediately above, are solid state shear pulverized to produce recycled, glass-filled polymeric particulates (e.g. powder) without the need for costly sortation, without the need for pelletization prior to use as feedstock in powder feedstock-using melt processing techniques, and in a manner to achieve in-situ compatibilization of thermodynamically incompatible polymers in a once-through pulverization operation that avoids the need to add a compatibilizing agent. Moreover, commingled, unsorted plastic scrap containing mixed-color scrap polymeric materials can be recycled without sortation to produce recycled, glass-filled polymeric particulates (e.g., powder) melt processable to substantially homogeneous light color articles of manufacture without the color streaking or marbleizing heretofore experienced with other recycling procedures.

As used herein, the term color is intended to have a broad meaning to include usual color hues and white as well as transparent and translucent appearance.

The recycled, glass-filled polymeric pulverized particulates of the invention produced from sorted or unsorted, commingled scrap materials undergo through chemical changes as characterized by DSC (differential scanning calorimetry) and ESR (electron spin resonance spectroscopy) which features are dramatically different from the those exhibited by unpulverized flake scrap material of the same composition. Moreover, molded components produced from the pulverized glass-filled particulates of the invention generally exhibit increased tensile strengths and lack of delamination upon breaking in mechanical testing depending upon the polymer components involved, these characteristics being indicative of in-situ polymer compatibilization.

In practicing the aforementioned illustrative embodiments of the present invention, polymeric scrap material is collected from several recycling centers (e.g. municipal recycling facilities commonly known as MRF's and/or industrial recycling centers). The collected scrap material may be already sorted by polymer type. In this event, each polymer type can be individually pulverized in accordance with the invention.

On the other hand, the collected scrap material may be unsorted and as a result include two or more different polymers which may be thermodynamically incompatible. Moreover, scrap material collected from different centers typically will be at least partially intermixed with scrap material collected from other centers as a result of the usual collection, transportation, storage, and handling procedures for the scrap material prior to recycling. Unsorted, commingled scrap material can result from this situation. In this invention, the plastic scrap is not treated to remove all of the glass particulates, which may contaminant the plastic material due to present recycling techniques in which single bins are used for consumer recycling.

The as-collected scrap material typically is initially cleaned to remove unwanted contamination. Cleaning of the as-collected scrap material can be effected by water rinsing and/or cleaning solutions to remove contaminants, such as food residue, detergents, oil, and other contaminants. However, the need for and type of cleaning procedure used for initial cleaning of the as-collected scrap material will depend upon the degree and the type of contamination present on the scrap material. Relatively clean as-collected scrap material may not require any cleaning prior to pulverization. Techniques to remove glass contamination is not required in this invention.

Before or after cleaning, the as-collected, scrap material, whether of the sorted or unsorted, commingled type, initially is comminuted by grinding, chopping or shredding prior to pulverization to provide a polymeric scrap feedstock comprising flakes F. The flakes F typically have sharp, angular surfaces resulting from the comminution operation and usually have different colors with the number of colors present in the scrap feedstock M depending upon the particular composition of the feedstock. The scrap flakes F typically have sizes in the range of 0.10 to 0.30 inches for maximum width dimension and 0.02 to 0.06 inches for thickness dimension, although the as-collected scrap material can be comminuted to other flake sizes and shapes for solid state pulverization pursuant to the invention. A conventional scrap chopping machine of the grinder type can be used in practicing the invention, although other comminuting machines also can be used to this end.

After the cleaning process, which is not required to be so extensive as to remove any glass material from the polymer, the commingled glass-containing scrap flakes can be further ground to reduce glass particulate size, or press-treated as noted above to crush and further grind the glass particles to the appropriate size. Before, during or after this process, a portion of the glass particulates can be removed by a brushing or airblowing process, if the glass particulate component is at a level which would make it difficult to palamerize the plastic scrap by the solid state pulverization process. It is believed that the commingled plastic and glass scrap material can contain about 1 to 40% by weight of glass. Levels of the glass component of 1 to 20% by weight is believed to provide an effective glass-filled polymeric component, subsequent to solid state shear pulverization.

The comminuted sorted or unsorted, commingled glass-containing scrap flakes F are supplied as feedstock to a twin-screw extruder 10 shown schematically in FIG. 1 to effect solid state shear pulverization of the flake scrap material in accordance with the invention. Comminuted unsorted, commingled scrap material from different sources can be fed to the extruder as feedstock. Still further, comminuted unsorted, commingled scrap material from different sources can be fed to the extruder as distinct, sequential feedstocks. Alternately, comminuted flake scrap material that is sorted so as to have a single polymer composition or generic type (e.g. HDPE, PP, etc.) can be fed to the extruder as feedstock.

The extruder 10 includes a feeder 12 for receiving the glass-containing polymeric flake scrap feedstock M for transport by the twin screws 14 (only one shown) through the extruder barrel zones S1-SN TOTAL where SN TOTAL corresponds to the total number of extruder zones. The first zone S1 is a material feed zone communicated to the feeder 12. Extruder barrel zones S2-SN each may be heated by external electric heater bands BH on the extruder barrel 16, depending on the composition and degree of crystallization of the scrap components being fed to the extruder. Zones S2-SN are followed by zones SN+1 to SN TOTAL that are cooled by coolant manifold bands or collars BC on the extruder barrel 16 (with the exception of certain barrel throttle zones not shown in FIG. 1 which are air cooled).

Alternately, the extruder barrel zones S2-SN are cooled by coolant bands similar to coolant bands BC followed by the aforementioned cooled downstream extruder zones SN+1-SN TOTAL such that only frictional heating of the scrap material occurs in the extruder. Use of the cooled extruder barrel zones S2-SN TOTAL is preferred to facilitate temperature control of the scrap material during the pulverization operation and to reduce degradation of the polymer and dye or colorant used with the polymers. Energy consumption during the pulverization operation also is reduced compared to conventional scrap batch grinding processes.

In FIG. 1, the glass-containing flake scrap material feedstock M is supplied by the feeder 12 to the twin-screw extruder 10 having side-by-side, intermeshing, co-rotating screws 14 (only one shown in FIG. 1) in the extrusion barrel 16, although the invention generally envisions using one or more extruder screws to achieve solid state pulverization. The screws 14 are rotated in the same direction by drive motor 18 through a gearbox (not shown) to transport the scrap material along the length of the screws 14 and subject the scrap feedstock to temperature and pressure conditions for a given scrap feed rate effective to achieve solid state shear pulverization thereof (without melting of the polymers) and in-situ compatibilization of any thermodynamically incompatible polymers present in the scrap feedstock, The solid state pulverization avoids melting of the polymeric scrap material in the feedstock but can involve softening of one or more of the polymers in the feedstock.

Uniform pulverized, glass-filled polymeric particulates P (e.g. powder) are discharged at the open (dieless) discharge end 16a of the extruder barrel 16. The glass-filled pulverized particulates P exhibit differential scanning calorimetry (DSC) and electron spin resonance spectroscopy (ESR) characteristics different from those exhibited by the unpulverized flake scrap feedstock M. Moreover, increased tensile strengths and lack of delamination upon breaking of testing specimens molded from the pulverized powder are further indicative of in-situ polymer compatibilization.

Figure 2:
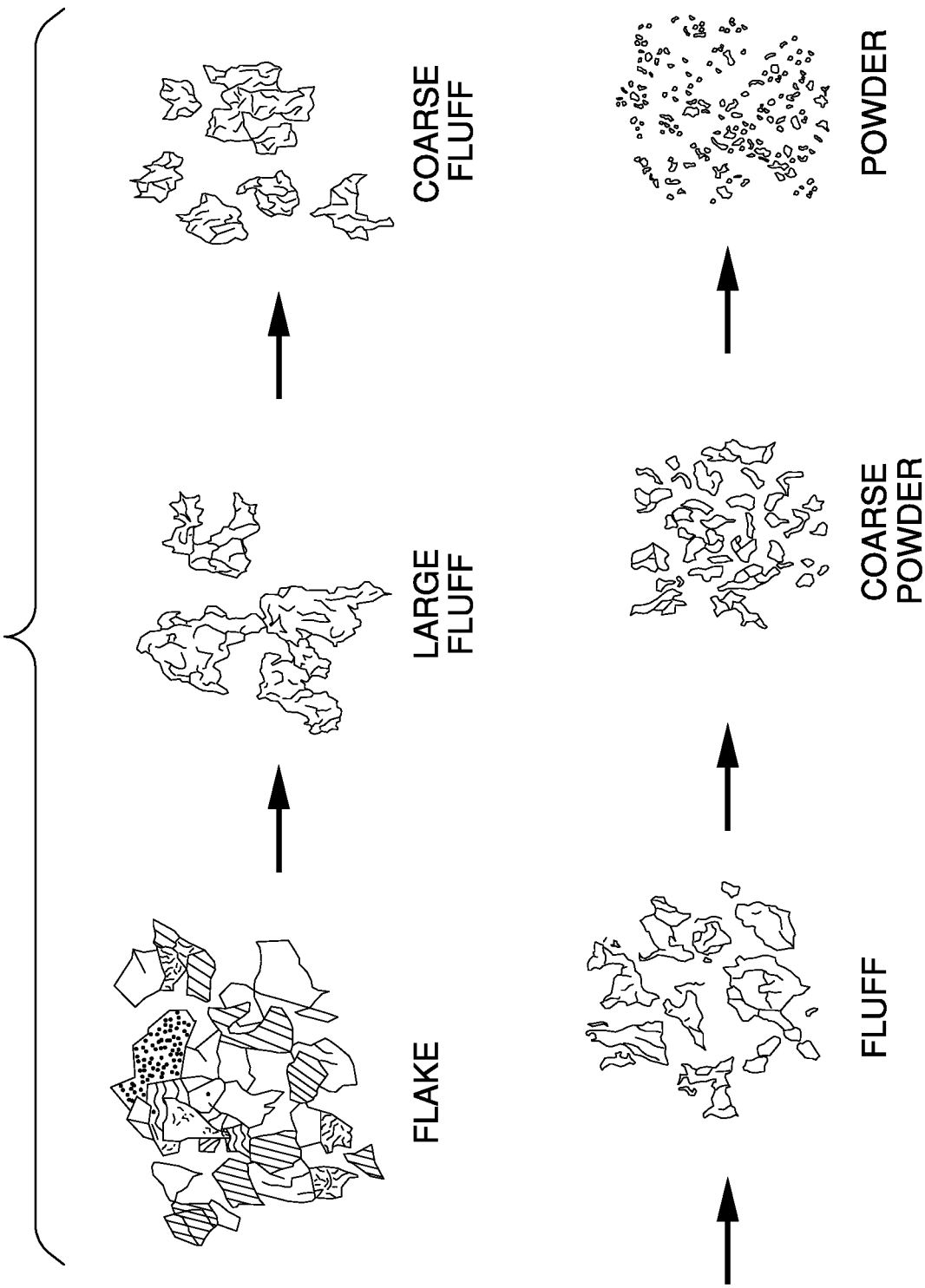
FIG. 2 represents the morphological transformation of flake-shaped scrap feedstock to powder due to solid state shear pulverization in the extruder in accordance with the invention.

The morphological transformation of the scrap feedstock M, whether of the sorted or unsorted, commingled type, as it is transported through the typical zones S1-SN of the extruder barrel 16 and subjected to solid state shear pulverization therein is illustrated in FIG. 2. For purposes of illustration and not limitation, feedstock M is shown in FIG. 2 including three (3) different flake colors by the three different flake surface shadings shown (i.e. cross-hatched, dotted, and clear flakes).

Referring to FIG. 2, the scrap flakes F are transformed first to large fluff having a particle morphology characterized as fibrous, easily-peeled, laminated particles and substantially homogeneous light color based on a dominant color of a particular scrap component in the feedstock M. During the pulverization process, the flakes F appear to be sheared and deformed into elongated strands. These strands break to form roughly spherical (rounded) particles. The large fluff is further transformed to coarse fluff, fluff, coarse powder and then powder as illustrated in FIG. 2 in dependence on the location of the scrap feedstock along the length of the extrusion screws 14. Both the fluff and powder products of solid state pulverization can find use as feedstock in melt and other polymer processing techniques to form shaped articles of manufacture.

As is apparent, the size of the scrap particulates gets smaller as the feedstock passes along the length of the screws 14. The fragmentation of the feedstock that occurs during pulverization produces powder particles that can be smaller than any of the clearances between barrel and screws of the extruder 10. Moreover, although not apparent from FIG. 2, the color of the scrap particulates typically gets slightly lighter as the feedstock is transported along the length of the screws 14 such that the pulverized powder P has a substantially homogeneous light pastel color tone based on a dominant color of a scrap component in the feedstock. For example, if the feedstock M includes white, blue and orange colored particulate flakes F in equal proportions, the color of the large fluff will be a homogeneous light pastel orange color tone. If the feedstock M includes white, red, blue and yellow colored particulate flakes F in equal proportions, the color of the large fluff will be a homogeneous light pastel rose color tone. As will be explained, the substantially homogeneous light pastel color of the fine recycled polymeric powder persists through subsequent melt processing (e.g. injection molding) to yield a product having a substantially homogeneous, single light pastel color tone without color streaking or marbleizing.

The glass-filled pulverized particulates P (powder particles) have a rounded shape and smooth surfaces which are suggestive of a solid state shearing phenomenon. The powder particles typically have a size of less than about 500 microns. The size range of a particular recycled polymeric powder produced by the invention will depend on composition of the feedstock M, the degree of crystallization of the scrap components of the feedstock M, screw configuration, and the pulverization parameters employed, such as pulverization temperatures, pressures, screw rpm, and feed rates of the feedstock M through the extruder 10.

Importantly, as mentioned, any thermodynamically incompatible polymers and glass present in the feedstock M are in-situ compatibilized during solid state shear pulverization in the extruder 10 as evidenced by production of pulverized polymeric particulates P at the discharge end of the extruder that exhibit DSC and ESR characteristics different from those of the unpulverized flake scrap feedstock M of the same composition. Moreover, the recycled particulates exhibit chemical changes (enhanced reactivity) as compared to the unpulverized flake scrap feedstock M as indicated by changes in the ESR spectra showing presence of free radicals. Importantly, the glass particles are uniformly dispersed within the polymeric particulates. It is possible, that the polymeric chains which are formed by the extrusion process include silyl or siloxane constituents.

In practicing the invention to achieve solid state shear pulverization of the scrap feedstock M in the manner described hereabove, the twin-screw extruder 10 can comprise for purposes of illustration and not limitation the model ZE 40A twin-screw extruder (L/D 40.5) manufactured by Hermann Berstorff Maschinenbau GmbH, PO Box 629, D-3000 Hanover 1 Germany. The ZE 40A twin-screw extruder includes twin, side-by-side intermeshing screws having a modular construction wherein each screw includes a series of standard screw elements mounted end-to-end in a selected sequence on a continuous screw shaft. The screw elements or stages include fluted transport elements, kneading or shearing elements, and spacer elements mounted in a selected sequence on the continuous shaft to accommodate variations in pulverization parameters and feedstock compositions, as necessary. In particular, the screws 14 can be modified by selection of appropriate transport elements, kneading or shearing elements, and spacer elements and their sequential arrangement and element lengths along the axis of the screw shaft.

Moreover, the ZE 40A twin screw extruder includes an extruder barrel 16 having a modular construction wherein a series of standard barrel sections or zones are secured (e.g. bolted) together end-to-end to provide a continuous extruder barrel 16. The barrel sections are adapted to have the electrical heating bands BH or the liquid cooling manifold bands BC mounted thereon for controlling temperature of the extruded material.

The ZE 40A twin screw extruder is described in detail in product brochure entitled "Berstorff High Performance Twin Screw Extruders ZE*ZE-A*ZE/ZE-A" available from Berstorff Corporation, 8200 Arrowridge Blvd., PO Box 240357, Charlotte, N.C., 28224. In addition, twin screw extruders of this general type are described and shown in U.S. Pat. No. 4,607,797, the teachings of which are incorporated herein by reference.

Regardless of the type of extruder utilized, the metallurgy of the extruder should be hard enough to withstand the hardness of the glass particles which are being pulverized and mixed with the plastic therein. It is even possible to coat the internal barrel of the extruder and the rotating screws with a ceramic material, which can withstand the hardness of the glass scrap which is being treated.

Figure 3:
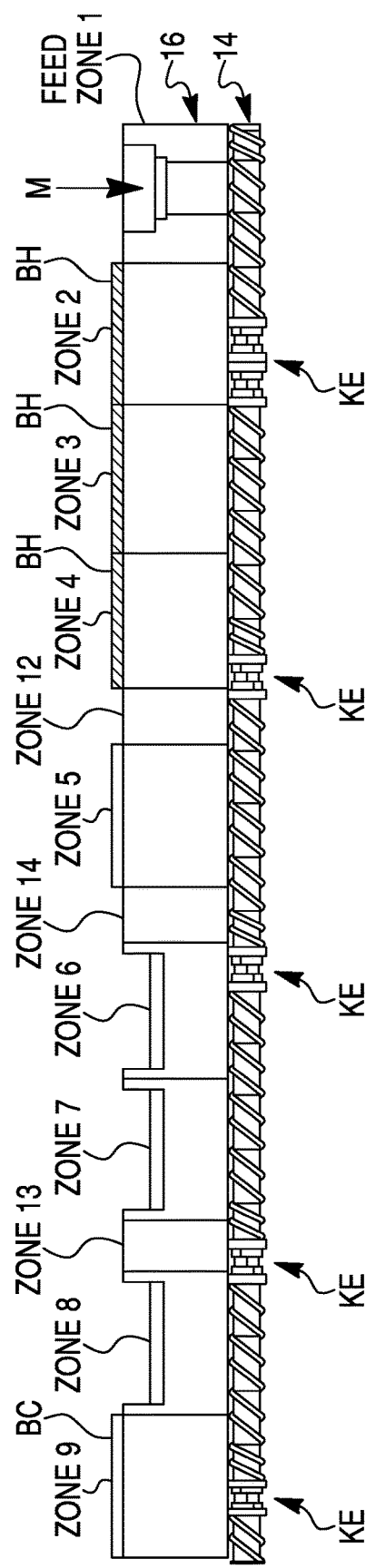
FIG. 3 is an elevational view of a representative screw used in practicing the invention when the scrap material is heated by heater bands on the extruder barrel (partially shown).

FIG. 3 illustrates the extruder barrel and screw configuration used in practicing the aforementioned embodiment of the invention wherein the scrap material is heated in the zones 2-4 by the electrical heating bands BH mounted on those barrel sections or zones. Zones 5-9 are cooled by the coolant manifold bands BC. Barrel throttle zones 12, 13 and 14 are air cooled.

Figure 4:
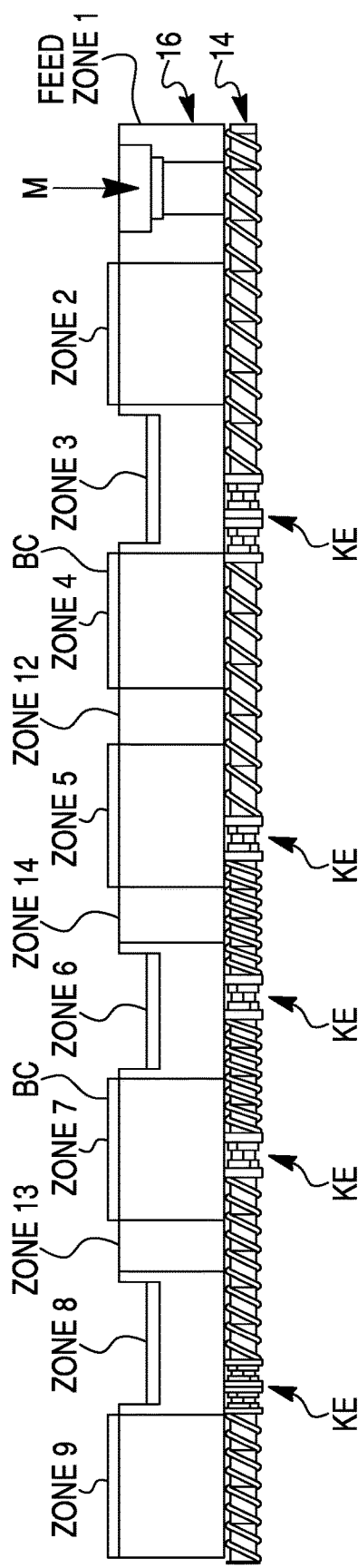
FIG. 4 is an elevational view of a representative screw used in practicing the invention when the scrap material is subjected only to frictional heat in the extruder barrel (partially shown).

FIG. 4 illustrates the extruder barrel and screw configuration used in practicing the aforementioned embodiment of the invention wherein the scrap material is heated only by frictional engagement with the twin screws 14. In FIG. 4, the barrel sections or zones 2-9 are cooled by coolant bands BC disposed thereon. Barrel throttle zones 12, 13 and 14 are air cooled.

Only one screw 14 is shown in FIGS. 3 and 4; however, the other screw 14 is identical and in intermeshing relation thereto as is known and shown in the aforementioned U.S. Pat. No. 4,607,797.

The invention is not to be construed as limited to the particular type or sequence of screw elements and barrel sections shown in FIG. 3-4 or the particular twin-screw extruder described. Extruder barrel and extruder screw configurations used in practicing the invention can be different from those shown and may depend upon the composition and degree of crystallization of scrap components of the feedstock M as well as other factors in order to achieve solid state shear pulverization and in-situ polymer compatibilization of the feedstock M to pulverized particulates in accordance with the invention.

The scrap feedstock M is subjected to solid state shear pulverization in the extruder 10 in a once-through operation by rotation of the twin screws 14 in the same directions by motor 18 so as to transport the feedstock M along the length of the screws 14 and subject the feedstock M to temperature and pressure conditions (for a given feedstock feed rate through the extruder) effective to achieve solid state shear pulverization (without melting) of the flake-shaped scrap particulates and in-situ polymer compatibilization of thermodynamically incompatible polymers present in the feedstock M. The solid state pulverization avoids melting of the polymeric scrap material in the feedstock but can involve softening of one or more of the polymers in the feedstock.

With respect to the temperature parameter at a given feedstock feed rate, the feedstock M can be heated at extruder barrel sections or zones 2-4 depending upon the composition of the feedstock M followed by cooling in all subsequent barrel zones of the extruder to maintain proper temperature control for solid state pulverization, in-situ polymer compatibilization, if necessary, and production of desired powder size.

Heating of the feedstock M in barrel zones 2-4 is achieved by energization of the electrical heater bands or collars BH mounted on the barrel zones 2-4. Cooling of the feedstock at barrel zones 5-9 is achieved by individual, coolant manifold bands or collars BC mounted on each barrel zone, and supplied (from a common coolant manifold conduit not shown) with a water/glycol mixture that is chilled to nominally 35.degree. F. and pumped by a conventional pump (not shown) at a selected flow rate through the manifold bands BC. Barrel throttle zones 12, 13 and 14 are air cooled by ambient air.

Heating of the scrap feedstock M in barrel zones 2-4 may be effected when pulverizing a feedstock M having a large percentage of amorphous or crystalline scrap polymeric materials. Pulverization occurs in cooled barrel zones where the kneading or shearing elements KE are located. Polymeric material is transported to the kneading or shearing elements by the fluted transport elements appropriately positioned along the lengths of the screws to this end. The screw elements in each zone should be selected appropriately. Spacer elements are used to provide the appropriate screw length for the extruder barrel used.

Preferably, the scrap feedstock M is subjected to only frictional heating in barrel zones 2-4 by engagement with the rotating screws 14. That is, solid state pulverization of the scrap feedstock in barrel zones 2-4 is conducted without heating of the feedstock by external heater bands BH. Instead, all barrel zones 2-9, are cooled by coolant manifold barrels or collars BC disposed on the extruder barrel. Pulverization occurs in cooled barrel zones where the kneading or shearing elements KE are located. This heatless pulverization of the scrap feedstock M is advantageous to reduce heat degradation of the polymers and dyes (or other colorants) present with the polymers. Energy consumption during the pulverization operation also is substantially reduced.

In general, the temperature of the scrap feedstock M is maintained at a level below the melting temperature of the individual scrap components or constituents in the feedstock M at all barrel zones of the extruder 10 regardless of whether barrel zones 2-4 are heated or cooled. In this way, solid state shear pulverization can be conducted in the solid state at all stages of the extruder 10. The temperature of the feedstock M at each stage of the extruder 10 will depend on the particular feedstock composition being pulverized.

For example, scrap feedstock temperatures to achieve solid state shear pulverization will depend upon the ratio of various polymers in the feedstock M. In particular, the feedstock temperature is adjusted to accommodate a relatively high proportion of amorphous, polymeric material (e.g. PS) in the feedstock M. For high proportions (e.g. 70 weight %) of amorphous scrap materials, the temperature is lower as compared to the feedstock temperatures used to pulverize a feedstock M having a high proportion of crystalline scrap materials (e.g. PP). The feedstock temperature needed for solid state shear pulverization of the feedstock M to powder can be related to glass transition temperature and/or melting temperature for particular feedstock compositions by suitable adjustment to heat output of barrel heater bands BH, if used, and to the coolant flow rate through the extruder coolant manifold bands BC.

Illustrative extruder barrel temperatures at various stages of the extruder 10 are described in certain Examples set forth below for various feedstock compositions for purposes of illustration and not limitation.

With respect to the pulverization pressure and shear rate, the pressure and shear rate are controlled for a given screw design by the torque and rotational speed (rpm) of the motor 18 rotating the screws 14. The pressure and shear forces on the scrap feedstock M are effective for given feedstock temperatures and feed rates to achieve solid state shear pulverization of the flake-shaped scrap particulates in the manner described hereabove to achieve formation of the rounded powder and in-situ polymer compatibilization. The feedstock pressures and shear rates to achieve solid state shear pulverization will depend upon the ratio of various polymers in feedstock M. For high proportions (e.g. 70 weight %) of amorphous scrap materials, the energy consumption is higher as compared to the feedstock pressures used to pulverize a feedstock M having a high proportion of crystalline scrap materials. The feedstock pressures needed for solid state shear pulverization of the feedstock M to powder can be determined empirically for particular feedstock compositions by suitable adjustment to the torque and rpm of screw drive motor 16 at given feedstock temperatures.

The through-put (e.g. pounds per hour) of the scrap feedstock M through the extruder is controlled in conjunction with temperature and pressure to achieve solid state shear pulverization of the flake-shaped scrap particulates. The through-put for given feedstock temperature/pressure parameters needed for solid state shear pulverization of the feedstock M to fine powder can be determined empirically for particular feedstock compositions by suitable adjustment to the rpm of drive motor 16 for screws 14.

By proper selection of the pulverization temperatures, pressures, through-puts, and screw configuration and rpm, the glass-filled pulverized polymeric particulates P (e.g. powder) are discharged at the open (dieless) discharge end 16a (i.e. open end without the usual extrusion die) of the extruder barrel 16. The particulates P typically are discharged onto a conventional endless conveyor (not shown) or other cooling/transport device, such as a spiral cooling device, capable of cooling powders and transporting powders to a storage location. During transport on the conveyor, the recycled pulverized powder can be allowed to cool to ambient temperature preferably in an atmosphere inert to the powder, such as a nitrogen blanket. Use of an inert blanket avoids oxidation of the pulverized powder.

The recycled pulverized particulates P of the invention are made without the need for a compatibilizing agent despite the presence of two or more thermodynamically incompatible polymeric scrap materials in the initial feedstock M. Moreover, the recycled pulverized particulates P of the invention can be directly processed (i.e. without pelletization) by conventional rotational molding, blow molding, extrusion (extruded PVC pipe and profiles), spray coating and other melt processing techniques requiring powder feedstock. Further, the recycled particulates P exhibit enhanced reactivity as compared to the unpulverized scrap feedstock M as measured by ESR. If produced from mixed-color scrap feedstock M, the recycled polymeric particulates, pulverized and as-melt processed, exhibit a substantially homogeneous light pastel color based on a dominant color of a scrap component in the feedstock M, although a color adjustment can be made, if desired, by suitable pigment additive to the feedstock and/or pulverized particulates.

Injection molded articles of manufacture produced from the recycled, pulverized glass-filled particulates P of the present invention exhibit mechanical properties generally superior to those exhibited by like-molded flake scrap polymer feedstock of the same composition and also a substantially homogeneous color characterized by the absence of color streaking or marbleizing, despite the powder having originated from mixed-color scrap feedstock. The homogenous color of molded articles produced from the pulverized particulates is quite surprising and unexpected given the mixed-color nature of the initial feedstock M.

Importantly, the recycled, glass-filled pulverized particulates P of the invention can be used in molding a plurality of articles that exhibit substantially the same homogeneous pastel color from one molded article to the next. In contrast, a mixture of flake scrap of like composition and mixed color produce molded articles exhibiting inconsistent colors from one molded article to the next.

The recycled particulates P of the invention also can be used in conventional coating procedures wherein powdered coating feedstock is used. For example, the recycled powder can be used as feedstock in coating processes, such as thermal spray, to produce homogeneously colored, thin coatings on various substrates.

The following Examples are offered for purposes of illustrating the invention in greater detail without in any way limiting the invention. These Examples involve sorted, washed, and chopped polymeric post-consumer flake scrap material obtained from several recycling sources throughout the United States; namely, HDPE and chopped LDPE flake scrap was obtained from St. Joseph Plastics in St. Joseph, Mo.; chopped PP scrap flake was obtained from SEI Recycling in Burlington, Wis.; and chopped PET scrap flake was obtained from Plastic Recyclers Southeast, Inc. in Athens, Ala. These scrap materials were obtained in 700 pound quantities. PVC scrap in flake form was obtained from Oxychem Corp. in Dallas, Tex. PS scrap in flake form was obtained from Maine Plastics in North Chicago, Ill.

Various proportions of these scrap materials were dry blended in order to simulate typical scrap feedstock compositions that would be encountered in the recycling of plastic scrap from municipal collection centers and industrial collection centers. Binary, ternary, and quaternary blends of different polymeric scrap materials were simulated (See TABLE I below). The scrap components of the dry blends are based on weight percentages of the components involved.

Various mechanical property test specimens were prepared by injection molding 1) the as-received individual flake scrap materials and their blends (referred to as "Flake" in Table I below) and 2) the pulverized powder P of the invention (referred to as "Pulverized" or "Pulv" in Table I below). A 4-cavity MUD family mold was used for injection molding with a 1 oz. Battenfield injection molding machine. Specimens were of the standard ASTM "dog bone" shape, approximately 5 inches long and 0.125 inch thick. Izod bars (2.5 inches long and 0.125 inch thick) and five-inch heat distortion temperature (HDT) bars were also similarly molded.

The injection molded specimens were used in the indicated ASTM tests of tensile strength/elongation (D638), notched Izod impact strength (D256), heat distortion temperature measurements (D648), and Shore D hardness (D2240). Tensile strengths are reported as ultimate tensile strengths for most specimens (yield strength being reported for the LDPE and PP specimens).

Tensile tests were measured with an Instron test machine (crosshead speed=2 inches/minute, gauge length=2.25 inches, strain rate=0.9 in./in.-min.). Elongations are reported at the breaking point.

Example 1

This example is taken from Example 4 of U.S. Pat. No. 5,814,673. The aforementioned chopped PP scrap flakes (obtained from SEI Recycling in Burlington, Wis.) were solid state pulverized using the aforementioned ZE 40A twin screw extruder. Although the flakes all comprised PP, they were of mixed-colors; i.e. white and taupe flakes, red flakes, yellow flakes, blue flakes and a small amount of black flakes.

The PP scrap flake feedstock was solid state pulverized pursuant to the embodiments of the invention described above wherein in one trial, there was no external heating of the scrap flakes in the extruder (i.e. heatless embodiment) and wherein the heater bands BH were energized to heat the scrap flakes in barrel zones 2-4 (i.e. externally heated embodiment).

TABLE I below sets forth the temperature, rpm (for motor 18), and scrap through-put employed in the trials to solid state pulverize the PP scrap flake feedstock. Both the extruder control set temperature and measured temperature of the scrap in the extruder are shown in TABLE I. As is apparent, the trial wherein external heating ("No heat") involved higher scrap temperatures, lower motor rpm and higher scrap through-put than when heater bands BH were used to heat the scrap flakes ("w/heat"). Pressure in the extruder was not measured in the Examples.

With respect to the configuration of the twin screws 14, the heatless trial used the screw configuration shown in FIG. 4. The externally heated trial used the screw configuration shown in FIG. 3.

The pulverized powder of the invention made without external heating of the extruder barrel zones (all barrel zones cooled) exhibited a similar morphology and a uniform purple/cranberry color. The injection molded shape made from this powder exhibited a substantially homogeneous, slightly more intense cranberry color without color streaking or marbleizing.

The mechanical properties measured from the aforementioned injection molded dog bone specimens made from the PP scrap flake feedstock and PP pulverized powder are set forth in TABLE I. These mechanical properties are discussed below.

TABLE I

| Materials | Tensile Properties | | | Notched Izod | HDT | |
|---|---|---|---|---|---|---|
| | Yield PSI | Ultimate PSI | % Elong | Impact Ft-Lb/In | Deg. C. 66 PSI | Shore D |
| PP Flake (1) | 4840 | | 330 | 0.7 | 102 | 72 |
| PP Pulverized (1) | 4730 | | 100 | 0.8 | 93 | 72 |
| PP - No heat pulv (1) | 5060 | | 300 | 0.6 | 97 | 74 |
| HDPE Flake (2) | | 3240 | 12 | 0.5 | 60 | 63 |
| HDPE Pulverized (2) | | 2870 | 7.5 | 0.5 | 60 | 63 |
| HDPE - No heat pulv (2) | | 3400 | 14 | 0.5 | 57 | 57 |
| LDPE Flake (3) | 1980 | | 33 | 0.8 | 49 | 56 |
| LDPE Pulverized (3) | 2060 | | 60 | 0.7 | 50 | 57 |
| LDPE - No heat pulv (3) | 2060 | | 32 | 0.7 | 49 | 57 |
| HDPE/LDPE/PP 60/30/10 Flake (4) | | 2680 | 9 | 0.4 | 58 | 62 |
| HDPE/LDPE/PP 60/30/10 Pulv (4) | | 2970 | 9 | 0.4 | 58 | 64 |
| HDPE/PP 70/30 Flake (5) | | 3740 | 11 | 0.4 | 68 | 67 |
| HDPE/PP 70/30 Pulv (5) | | 3850 | 12 | 0.4 | 68 | 67 |
| HDPE/PP 90/10 Flake (6) | | 3530 | 13 | 0.4 | 67 | 66 |
| HDPE/PP | | 3480 | 12 | 0.4 | 63 | 65 |

TABLE I-continued

| Materials | Tensile Properties Yield PSI | Ultimate PSI | % Elong | Notched Izod Impact Ft-Lb/In | HDT Deg C. 66 PSI | Shore D |
|---|---|---|---|---|---|---|
| 90/10 Pulv (6) HDPE/LDPE | | 2550 | 15 | 0.6 | 45 | 59 |
| 40/60 Pulv (7) HDPE/PET | | 3710 | 6 | 0.7 | 70 | 68 |
| 50/50 Flake HDPE/PET | | 3600 | 4 | 0.5 | 70 | 69 |
| 50/50 Pulv HDPE/PET | | 2870 | 4 | 0.4 | 72 | 68 |
| 60/40 Flake HDPE/PET | | 2790 | 3 | 0.2 | 70 | 68 |
| 60/40 Pulv HDPE/PET | | 4680 | 7 | 1.1 | 69 | 71 |
| 40/60 Flake HDPE/PET | | 4100 | 5 | 0.7 | 68 | 70 |
| 40/60 Pulv HDPE/LDPE/PET | | 2010 | 4 | 0.4 | 62 | 64 |
| 30/30/40 Flake HDPE/LDPE/PET | | 2520 | 5 | 0.3 | 62 | 65 |
| 30/30/40 Pulv HDPE/LDPE/PET | | 1880 | 4 | 0.3 | 63 | 64 |
| 40/30/30 Flake HDPE/LDPE/PET | | 2450 | 5 | 0.2 | 63 | 65 |
| 40/30/30/Pulv HDPE/LDPE/PET | | 2330 | 4 | 0.3 | 67 | 66 |
| 60/10/30 Flake HDPE/LDPE/PET | | 3020 | 50 | 0.2 | 67 | 68 |
| 60/10/30 Pulv HDPE/LDPE | | 2530 | 17 | 0.5 | 47 | 59 |
| 40/60 Flake HDPE/LDPE | 2500 | | 90 | 0.6 | 51 | 60 |
| 40/60 - No heat pulv HDPE/LDPE | | 2840 | 13 | 0.4 | 57 | 62 |
| 60/40 Flake HDPE/LDPE | | 2860 | 13 | 0.5 | 57 | 63 |
| 60/40 Pulv PP/PS 70/30 Flake | 5320 | | 16 | 0.6 | 93 | 76 |
| PP/PS 70/30 Pulv | 5120 | | 10 | 0.4 | 90 | 76 |
| PP/PS 70/30 - No heat pulv | | 5200 | 8 | 0.4 | 91 | 75 |
| PP/PS 30/70 Flake | | 5880 | 5 | 0.6 | 90 | 79 |
| PP/PS 30/70 Pulv | | 5780 | 4 | 0.45 | 88 | 79 |
| PP/PS 30/70 - No heat pulv | | 5950 | 5 | 0.4 | 90 | 80 |
| HDPE/LDPE/PP/PET 40/30/10/20 Flake | | 2300 | 6 | 0.2 | 59 | 65 |
| HDPE/LDPE/PP/PET 40/30/10/20 Pulv | 2710 | | 10 | 0.3 | 59 | 65 |
| HDPE/LDPE/PP/PET/PS 40/30/5/20/5 Flake | | 2020 | 4 | 0.2 | 63 | 64 |
| HDPE/LDPE/PP/PET/PS 40/30/5/20/5 Pulv | | 2610 | 8 | 0.2 | 64 | 64 |
| HDPE/LDPE/PP/PVC 55/30/10/5 Flake | | 2540 | 7 | 0.3 | 55 | 63 |
| HDPE/LDPE/PP/PVC 55/30/10/5 Pulv | | 2390 | 6 | 0.3 | 65 | 63 |
| HDPE/LDPE/PP/ PET/PVC 40/30/5/20/5 Pulv | | 2290 | 5 | 0.2 | 65 | 65 |
| HDPE/LDPE/PP/ PET/PS/PVC 40/30/5/15/5/5 Pulv | | 2210 | 5 | 0.2 | 61 | 65 |

It is noteworthy that the tensile strengths of injection molded specimens made from pulverized ternary HDPE/LDPE/PP and HDPE/LDPE/PET powder of the invention are consistently higher than the tensile strengths of molded specimens molded from the as-received blended flake feedstocks of the same materials. This increase in tensile strength for the pulverized powder molded specimens indicates an increased compatibility of the polymer components in the blend.

It is further noteworthy that even though some of the scrap feedstocks set forth in the Examples comprised a plurality of polyolefins (e.g. HDPE, LDPE, PP) that are mutually thermodynamically incompatible, the feedstocks were nevertheless successfully injection molded, and the molded specimens did not exhibit delamination upon breaking in the mechanical property tests, indicating that chemical change occurred during pulverization and the polymers have been in-situ compatibilized during the solid state shear pulverization process of the invention.

Furthermore, as mentioned above, the pulverized recycled powders of the invention exhibited enhanced reactivity as compared to the flake feedstock M prior to pulverization.

Example 2

A mixture of HDPE/PP flake (90/10) is mixed with 15 wt. % glass particles having an average particle size of about 100 microns. The mixture of polymer flake and glass particles are solid state pulverized as in Example 1. The product which emerges is a powder of uniform color, and the molded test specimens from the uniformly colored powder have improved tensile strengths relative to molded specimens molded from the as-received blended plastic flake feedstock.

The invention claimed is:

1. A method for preparing reconstituted composite particles from a single bin recycling mixture comprising the steps of:
    a) comminuting said single bin recycling mixture composed of a post-consumer polymeric material contaminated with post-consumer glass scraps, to form a composite mixture comprising glass and polymeric flakes having sharp and angular surfaces;
    b) effecting a chemical change to said composite mixture by application of mechanical energy thereto through solid state shear pulverization in the presence of cooling sufficient to maintain said composite mixture in the solid state during said pulverization to form reconstituted composite particles; and
    c) discharging said reconstituted composite particles.

2. A method for manufacturing of a powder of reconstituted composite material from a single bin recycling mixture, said method comprising the steps of:
    a) comminuting said single bin recycling mixture composed of a post-consumer polymeric material contaminated with post-consumer glass scraps, to form a composite mixture including glass and polymeric flakes having sharp and angular surfaces;
    b) introducing said composite mixture into a pulverization device having an inlet for said composite mixture, means for pulverizing said composite mixture to effect chemical change by means of solid state shear pulverization in the presence of cooling sufficient to maintain the composite mixture in the solid state during the pulverization, an outlet for said powder of reconstituted composite material, and means for cooling the temperature of said composite mixture between said inlet and outlet;
    c) cooling said composite mixture to maintain said composite mixture in the solid state without melting within said pulverization device;
    d) pulverizing said solid state composite mixture within said pulverization device to chemically alter said composite mixture; and
    e) discharging said powder of reconstituted composite material from said outlet.

3. The method of claim 1, wherein the solid state shear pulverization is effected by a co-rotating screw pulverizer.

4. The method of claim 1, wherein said single bin recycling mixture contains 1 to 40 wt. % of said post-consumer glass scraps.

5. The method of claim 1, wherein said post-consumer glass scraps are is pulverized to form glass particles which have less than 500 microns maximum dimension in said composite mixture.

6. The method of claim 1, wherein the chemical change includes bond rupture.

7. The method of claim 1, wherein said post-consumer polymeric material is a quantity of polymeric chips, said chips having a size in the range of about 0.10 to 0.30 inches maximum width dimension and about 0.02 to 0.06 thickness dimension.

8. The method of claim 1, wherein said post-consumer polymeric material comprises two or more polymeric materials selected from the group consisting of HDPE, LDPE, LLDPE, PP, PS, PET, PVC, polycarbonate, acrylonitrile butadiene styrene, and polyphenylene oxide.

9. The method of claim 5, wherein said glass particles have a particle size of 0.5 to 150 microns in said composite mixture.

10. The method of claim 9, wherein said post-consumer polymeric material in said composite mixture contains polymeric chains that include silyl or siloxane constituents.

11. The method of claim 2, wherein said solid state shear pulverization is effected by a co-rotating screw pulverizer.

12. The method of claim 2, wherein said composite mixture contains 1 to 40 wt. % of said post-consumer glass scraps.

13. The method of claim 2, wherein said post-consumer glass scraps are pulverized to form particles which have less than 500 microns maximum dimension in said composite mixture.

14. The method of claim 2, wherein the chemical change includes bond rupture.

15. The method of claim 2, wherein said post-consumer polymeric material is a quantity of polymeric chips, said chips having a size in the range of about 0.10 to 0.30 inches maximum width dimension and about 0.02 to 0.06 thickness dimension.

16. The method of claim 2, wherein said post-consumer polymeric material comprises two or more polymeric materials selected from the group consisting of HDPE, LDPE, LLDPE, PP, PS, PET, PVC, polycarbonate, acrylonitrile butadiene styrene, and polyphenylene oxide.

17. The method of claim 13, wherein said post-consumer glass particles have has a particle size of 0.5 to 150 microns in said composite mixture.

18. The method of claim 17, wherein said post-consumer polymeric material contains polymeric chains that include silyl or siloxane constituents.

* * * * *